No. 851,704. PATENTED APR. 30, 1907.
N. W. STORER.
METHOD OF SPEED REGULATION.
APPLICATION FILED JULY 24, 1905.

WITNESSES:
Fred H. Miller
R. V. Dearborn

INVENTOR
Norman W. Storer
BY
Wesley G. Carr
ATTORNEY

UNITED STATES PATENT OFFICE.

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF SPEED REGULATION.

No. 851,704.

Specification of Letters Patent.

Patented April 30, 1907.

Application filed July 24, 1905. Serial No. 271,056.

*To all whom it may concern:*

Be it known that I, NORMAN W. STORER, a citizen of the United States, and a resident of Pittsburg, in the county of Allegheny and State of Pennsylvania, have invented a new and useful Improvement in Methods of Speed Regulation, of which the following is a specification.

My invention relates to methods of regulating the speeds of vehicles or machines that are driven by electric motors, and it has for its object to provide a method of speed control that shall insure an increase in the efficiency of operation of the motors and of the system of distribution over the efficiencies heretofore obtained in practicing other methods.

The most practical method heretofore employed for regulating the speeds of vehicles or machines driven by series motors consists in connecting the motors in series relation for starting and slow speed running conditions and in parallel relation for full speed running conditions, intermediate speeds being obtained by varying the amount of resistance in the motor circuit. Since energy is wasted when regulating resistance is connected in the circuit, the only conditions of efficient operation when practicing this method are when the motors are connected either in series or in parallel without resistance in the circuit. Under these conditions the motors are obliged to meet all contingencies that arise, and since they are generally geared so as to meet the maximum speed conditions necessary to maintain a desired or required schedule, very inefficient operation results at slow speeds and wherever frequent stops are made. Locomotives and cars for most interurban railway systems are required to operate under these conditions, and it is therefore desirable that a method of speed control be employed which shall provide more efficient operation under all conditions than can be obtained in practicing the usual series-parallel method.

It is the object of my invention to provide such a method.

Figure 1:
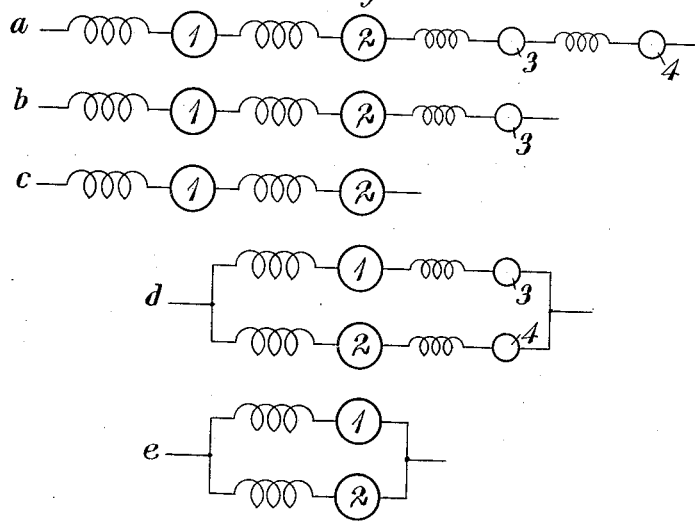
Figure 2:
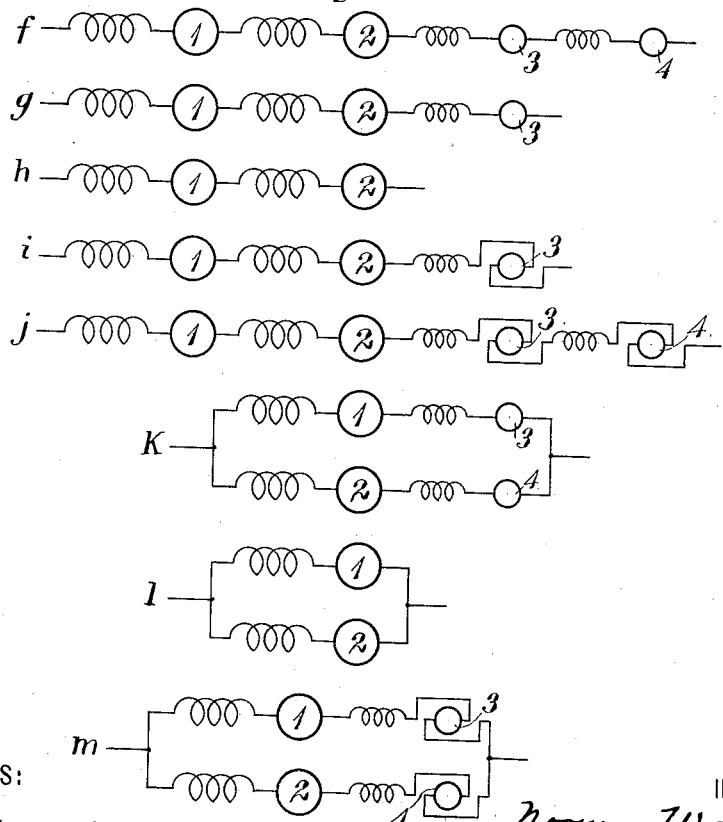

In the accompanying drawings, Figure 1 illustrates, diagrammatically, the essential successive relations of the motors one to another from starting to full speed running conditions, when connected in accordance with my invention, and Fig. 2 illustrates a modification of the conditions shown in Fig. 1.

My invention is especially adapted for use on cars having four driving axles to which motors may be geared, and when so applied, two of the motors should have sufficient capacity to operate the cars at the desired full speed and should be constructed to receive the full voltage of the supply conductors, and the other two motors should be smaller and should preferably be adapted to operate upon a lower voltage than that existing between the supply conductors. For example, the larger motors may be of eighty horse-power capacity and the smaller motors of twenty horse-power capacity, the voltage of the larger motors being normally five hundred and that of the smaller motors one hundred and twenty-five. In starting, the smaller motors should be connected in series with the larger motors and should be removed from the circuit consecutively in order to effect acceleration in speed. When the larger motors are changed from series relation to parallel relation, the smaller motors should also be changed from series relation to parallel relation, and in order to effect further acceleration in speed, should be removed from the circuit for the final step.

In Fig. 1 are shown the various steps in the method of operation just described, and for purposes of explanation, it may be assumed that the voltage of the supply circuit (not shown) to which the motors are connected is five hundred. The larger motors 1 and 2 may be assumed to be constructed for normal operation on five hundred volts and the smaller motors 3 and 4 for normal operation on one hundred and twenty-five volts. The motors are first connected all in series, as shown at *a*, two hundred volts being then supplied to each of the larger motors and fifty volts to each of the smaller motors. In the next step, one of the smaller motors is cut out of circuit and approximately two hundred and twenty-two volts will then be supplied to each of the larger motors and fifty-six volts to the remaining smaller motor. When the two larger motors are connected in series alone, as shown at c, two hundred and fifty volts is applied to each. As shown at d, a larger and a smaller motor are connected in series to constitute a set and the two sets are connected in parallel relation, the voltage applied to each of the larger motors being four hundred while that applied to each of the smaller motors is one hundred. In the final step, shown at e, the larger motors are connected in full parallel relation and five hundred volts will then be applied to each of them.

If it is desired to provide more running positions, the connections of the armatures of the smaller motors may be reversed and the motors connected in series with the larger motors, so that they may operate as boosters and raise the voltage applied to the larger motors. If the smaller motors are in this manner converted into boosters, two additional voltage steps may be provided between those shown at c and d in Fig. 1, which correspond to those shown at h and k, respectively, in Fig. 2. These new steps are indicated at i and j in Fig. 2 and the voltages applied to the larger motors will be greater than two hundred and fifty and less than four hundred, the voltage when only one of the smaller motors acts as a booster, as indicated at i, being less than when both motors act as boosters. The smaller motors may also act as boosters when the larger motors are connected in parallel relation, such a condition being shown at m in Fig. 2. The voltages applied to the larger motors in this case exceed that of the supply circuit.

My invention has special application to electric locomotives having two or more large driving axles and two or more auxiliary truck axles, in which the larger motors may be geared to the larger driving axles and the smaller motors may be geared to the auxiliary axles. In this manner, the total weight of the locomotive will be carried upon driving wheels and a much larger tractive effort may be exerted by such a locomotive than has heretofore been possible.

While I have shown and described my method as applied to the control of two large and two small motors, I desire it to be understood that any other number of motors may be controlled in accordance therewith and that the large and the small motors may differ in number. The arrangement and connections of the motors may also be varied from what has been specifically shown and described, and the normal operating voltages of the larger and smaller motors may assume any desired ratio other than what has been given. For example, two large motors and four small motors may be employed, the smaller motors being constructed to operate at one-half the voltage of the larger motors. Two of the smaller motors may be connected in parallel and controlled as a single motor, very much as before described. The smaller motors may even operate at the same voltage as the larger motors, if desired.

I claim as my invention:

1. The method of speed regulation which consists in connecting a large capacity motor in series with a small capacity motor, removing the small capacity motor from the circuit and so reconnecting said small capacity motor in circuit that it will operate as a booster.

2. The method of speed regulation which consists in connecting a plurality of large capacity motors in series with a plurality of small capacity motors, removing the small capacity motors from the circuit, connecting the large capacity motors in series with certain of the small capacity motors and in parallel relation to each other, and again removing the small capacity motors from the circuit.

3. The method of speed regulation which consists in connecting a plurality of large capacity, high voltage motors in series with a corresponding number of relatively small capacity, low voltage motors, removing the small capacity, low voltage motors from the circuit, connecting the large capacity motors in series with the corresponding small capacity motors and in parallel relation to each other, and again removing the small capacity motors from the circuit.

4. The method of speed regulation which consists in connecting a plurality of large capacity, high voltage motors in series with a plurality of small capacity, low voltage motors, removing the small capacity motors from the circuit, connecting the large capacity motors in series with corresponding small capacity motors and in parallel relation to each other, and again removing the small capacity motors from the circuit.

5. The method of speed regulation which consists in connecting a plurality of large capacity motors in series with a plurality of small capacity motors, removing the small capacity motors from the circuit, connecting the large capacity motors in series with certain of the small capacity motors and changing the circuit relations of the large capacity motors, and again removing the small capacity motors from the circuit.

6. The method of speed regulation which consists in connecting a plurality of large capacity, high voltage motors in series with a corresponding number of relatively small capacity, low voltage motors, removing the small capacity, low voltage motors from the circuit, changing the relations of the large capacity motors with respect to each other and connecting them in series with corresponding small capacity motors, and again removing the small capacity motors from the circuit.

7. The method of speed regulation which consists in connecting a plurality of high voltage motors in series with a plurality of low voltage motors, removing the low voltage motors from the circuit, changing the circuit relations of the high voltage motors with respect to each other, connecting them in series with certain of the low voltage motors, and again removing the low voltage motors from the circuit.

8. The method of speed regulation which consists in connecting a plurality of high voltage motors in series with a plurality of low voltage motors, removing the low voltage motors from the circuit, so re-connecting the low voltage in circuit that they will operate as boosters, again removing the low voltage motors from the circuit, changing the circuit relations of the high voltage motors with respect to each other and connecting them in circuit with the low voltage motors, again removing the low voltage motors from the circuit, and again so re-connecting the low voltage motors in circuit that they will operate as boosters.

9. The method of speed regulation which consists in connecting a plurality of large capacity motors in suitable circuit relations with a plurality of small capacity motors, then altering the circuit relations of the motors and finally removing one or more of the small capacity motors from the circuit in accordance with the desired conditions of speed regulation.

In testimony whereof, I have hereunto subscribed my name this 18th day of July 1905.

NORMAN W. STORER.

Witnesses:
F. E. WYNNE,
BIRNEY HINES.